Oct. 18, 1966   G. E. BROWN, JR., ET AL   3,279,424
APPARATUS FOR COATING WEBS WITH POLYMERIZABLE MATERIALS
Filed Nov. 2, 1960
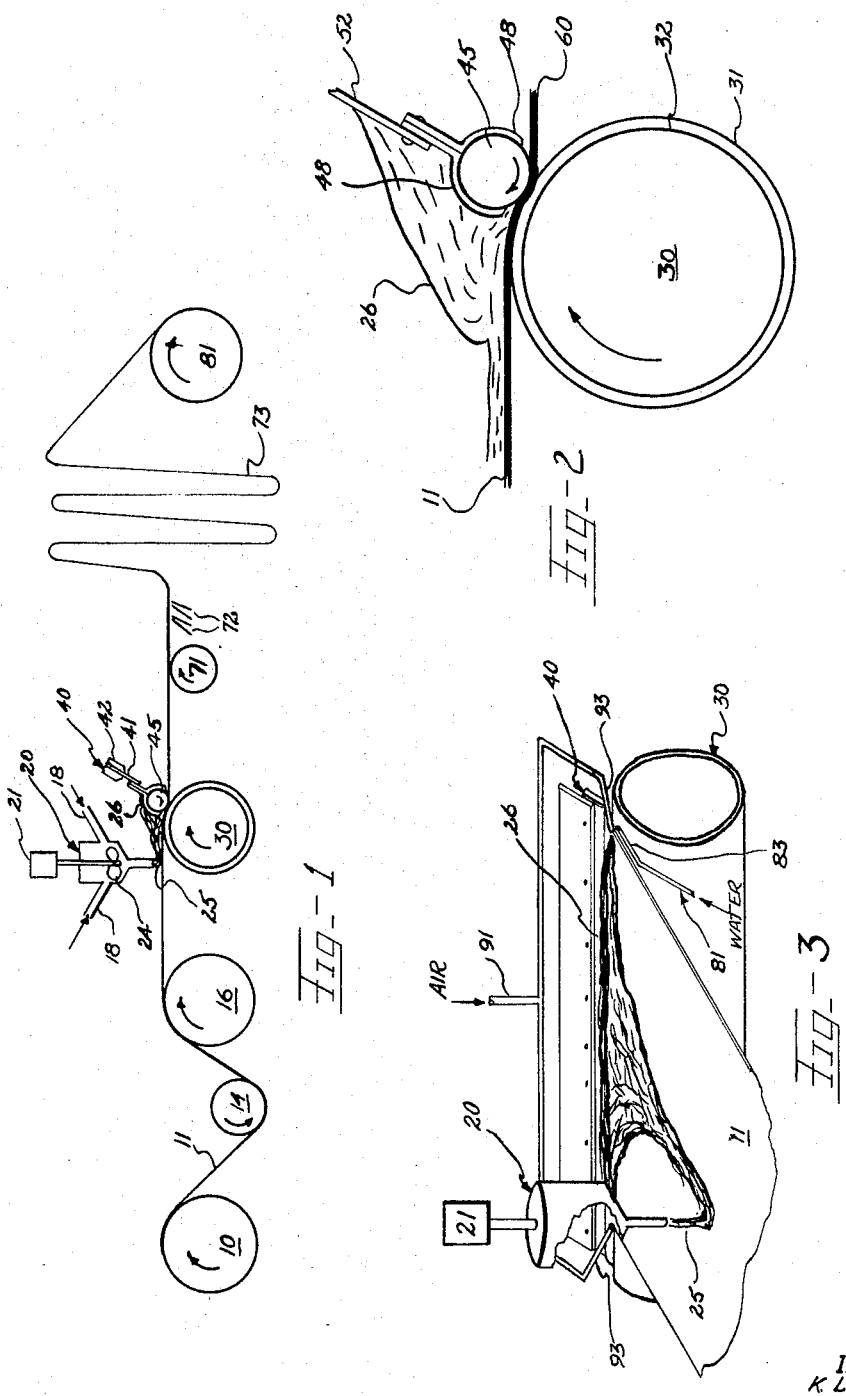
INVENTORS
K. L. HACKLEY
G. E. BROWN JR.
D. H. NOWAK
E. A. WOLFF
BY
Donald A. Hoes
ATTORNEY 3,279,424
APPARATUS FOR COATING WEBS WITH
POLYMERIZABLE MATERIALS
George E. Brown, Jr., Glendale, Kenneth Lewis Hackley, Oxford, and David H. Nowak and Edmund A. Wolff, Hamilton, Ohio, assignors to Champion Papers Inc., Hamilton, Ohio, a corporation of Ohio
Filed Nov. 2, 1960, Ser. No. 66,774
3 Claims. (Cl. 118—119)

This invention relates to a method and apparatus for coating webs with polymerizable materials to produce plastic films thereon.

Although methods of continuously coating webs with compositions containing synthetic polymeric materials to produce high gloss, printable coatings have been practiced commercially for many years, methods employing coatings which contain polymerizable materials for such purposes have received comparatively little attention. This has been primarily due to the fact that the problems encountered with the latter are largely unrelated to those found with conventional type coatings containing already polymerized materials. When the coating contains a polymerizable material, difficulty has previously been encountered in applying a smooth uniform coating without polymerization of the coatings. Such polymerization during the coating operation will clog the coater and require stopping the coater until it can be cleaned up. While many coating techniques have been suggested and employed commercially for applying polymerizable coatings preliminary to subsequent laminating operations, such methods have not proven suitable when it is merely desired to produce a coated web which has a smooth, high gloss surface and which would be suitable for printing. When the coating is to be laminated, surface defects such as streaks, bubbles, etc., in the coating are not of significant importance. When the coated web is to be employed as such for printing, however, such defects will render the product unsaleable. A further drawback of prior art methods of coating with polymerizable coatings is their inability to deposit a uniform and thin layer of coating. Since a continuous layer of plastic of even the thinnest magnitude will often provide all the barrier properties required, a method which can apply only excessive amounts of coatings is not desirable for economic reasons.

It is therefore an object of this invention to provide a process for coating webs with polymerizable materials.

Another object of this invention is to provide a process for coating webs with polymerizable material so as to produce a smooth surfaced plastic layer thereon.

Still another object of this invention is an improved process for coating webs with polymerizable material to produce a plastic layer of the desired thickness thereon.

Another object of this invention is an improved process for coating cellulosic webs with polymerizable materials which contain little or no water.

A further object of this invention is an apparatus which is particularly suitable for the production of polymeric coatings on moving webs.

These and other objects of the invention will be more clearly apparent from the description which follows.

In accordance with this invention it has been found that smooth plastic films of synthetic polymers may be produced on moving, flexible webs by supplying to the web surface a liquid coating having a continuous organic phase as hereinafter described and containing a polymerizable material. The web having the coating thereon then passes into a nip formed by a pair of rotating cylindrical surfaces. The surface in contact with the coating constitutes a doctoring or smoothing device and desirably is of a small diameter. Preferably it is rotated in an angular direction which is opposite to the movement of the web. The cylindrical surface which is not in contact with the coating is rotated in the same angular direction as the web and preferably at about the same speed. It is desirable that this second surface or back-up roll, have a resilient surface. The pressure of the doctor device against the web and back-up roll serves to spread the coating throughout the width of the web by forming a pool of coating in the nip. The web emerges from between the pair of rolls with a uniform smooth deposit of coating thereon. The coated web is then subjected to an elevated temperature to polymerize the coating.

The coating method of this invention has the distinct advantage over prior methods in that it deposits a uniform smooth coating on the web. In most cases the coating will be so smooth, in spite of the roughness of the web, as to have the appearance of a cast coated web. In fact, the gloss of the resultant coatings will in many cases exceed that of a cast coated web. Any foreign particles in the coating or on the web are swept back by the rotating action of the reverse rotating doctor device and hence do not give rise to streaks in the coating. Since premature polymerization is kept at a minimum, the coating operation can ordinarily be operated continuously for unlimited periods of time.

Prior art methods of applying polymerizable coatings which have employed a roll type coater have nearly always resulted in polymerization of a portion of the coating on the surface of the roll. Moreover when such a roll is used in conjunction with a dip pan or other similar source of supply of the coating, polymerization has been encountered therein as well since portions of the coating tend to accumulate in the supply source without being rapidly applied to the moving web. Although the trailing blade or knife-type coaters largely overcome the problem of polymerization during coating, nevertheless, such coaters result in streaks and other defects in the coating because of the accumulation of foreign particles in the nip.

The invention will be further described with reference to the accompanying drawing in which:

FIG. 1 is a diagrammatic view showing the unwinding, coating, drying and winding of a flexible web.

FIG. 2 is an enlarged detailed view of the coating device.

FIG. 3 is a pictorial view of the coating device.

Referring first to FIG. 1, a web 11 is led from an unwind roll 10 under tension control roll 14, over guide roll 16, and under mixer 20. Mixer 20 contains two or more supply sources 18 for the introduction of components of the polymerizable coating, usually under pressure. For example, catalyst or initiator may be introduced at one supply source, and the polymerizable monomer or polymer at the other. The components of the coating are mixed by any suitable stirring device 24. The stirring device 24 is driven by a power supply such as motor 21. The quantity of polymerizable coating 25 discharged from mixer 20 can be controlled in various ways, but preferably by the speed at which the components of the coating are introduced into the mixer.

The flow of coating 25 from mixer 20 onto the moving web 11 must be sufficient to form a small pool 26 of coating extending throughout nearly the entire width of the web. The rotating doctor rod 45 of spreader 40 serves to spread the coating throughout this distance. Normally there will be a slightly greater build-up of coating at the center of the web width if the mixer 20 is located over the center of the web. If desired the mixer may be mounted on a reciprocating carriage so as to form a pool of nearly uniform cross section across the web. In order to confine the coating to the surface of the web and prevent it from flowing beyond the web edges, a pair of air jets can be located at the edge of the web and directed toward the pool. This will be more fully discussed with reference to FIG. 3 hereafter.

Referring to FIG. 2, the details of the spreader 40 will be discussed more particularly. The web, having the coating deposited on the surface thereof passes into a nip between the cylindrical surfaces of back-up roll 30 and doctor rod 45. Doctor rod 45 is made of a material having a rigid surface such as metal. It has a cylindrical form and is preferably of small diameter such as on the order of one-eighth to one-half inch in diameter. A socket or holder 48 embraces the doctor rod around more than one-half of its circumference. The rod and holder may be mounted in any manner which permits its rotation in an angular direction which is opposite to the movement of the web. Particularly good results are attained when it is flexibly mounted by a spring mount 52 such as described in U.S. Patent 2,729,192 to Edgar Warner. A mounting of the doctor rod as described in the Warner patent results in a uniform coating which is virtually free of streaks because it permits compensation for uneven pressures between the length of the doctor rod and the web. Further compensation of uneven pressures can be achieved when the back-up roll 30 has a yielding resilient covering 31 of the rubber or the like. For the rubber cover 31 on roll 32, a Pusey and Jones density of about 80 to 120 has been found satisfactory with doctor rods of about one-fourth inch diametr.

The pressure exerted by the cylindrical surface of doctor rod 45 against the web and consequently against back-up roll 30 may vary widely. In actual practice it has been found that variations in this pressure will have remarkably little effct on the amount of coating deposited on the web. Ordinarily a lineal pressure of 1 to 10 pounds per linear inch across the length of the doctor rod will be adequate. The speed of rotation of the doctor rod is not critical, and usually surface speeds of about one foot per minute are sufficient.

By having the pool of coating of a sufficient height to cover the leading edge of the doctor rod, there is no chance of air becoming entrapped in the nip between the web and the doctor rod which would cause surface defects in the coating. Because the volume of coating contained in the pool is relatively small and because some of it is being continuously withdrawn while more is added, there is little possibility that any given portion of the coating will remain in the pool for more than a few moments and give premature polymerization in the pool.

Although the exact reason for the phenomena is not fully understood, the most satisfactory results have been obtained when the back-up roll 30 and doctor rod 45 are so arranged that the coated web is discharged from the nip in such a manner that it is still in contact with the doctor rod after passing out of contact with the back-up roll. In other words, the coated web emerges from the nip tangential to the doctor rod but not to the back-up roll. Thus, as shown in FIG. 2, the coated web wraps about the doctor rod for a portion of its circumference after passing out of contact with the surface of the back-up roll. In practice it has been found that the best results are attained when the coated web remains in contact with the circumference of the doctor rod for at least 5° of arc, and preferably at least 10° of arc, after it passes out of contact with the back-up roll.

Since the coating may polymerize upon prolonged standing, it is important that the supply of coating in the pool does not become so excessive as to result in any substantial amount of polymerization. In this regard it is desirable that the amount of coating which is contained in the nip at any given instant should be such that it would be depleted by continued operation, without the addition of more coating, within a period of time which is less than the "pot life" of the coating, i.e., the time required for the coating to polymerize at the coating temperature.

The coating operation is desirably performed at room temperature in order to minimize premature polymerization. In practice this may vary from 60° to 100° F. or slightly above depending upon the temperature in the coating room.

As the coated web 60, having a uniform deposit of coating on the web, emerges from the nip it is desirably passed over a vertically adjustable guide roll 71 which serves as a means of regulating the wrap of the web about the doctor rod. The coated web then passes through an area of elevated temperature. In the drawing the source of the elevated temperature is represented by a series of hot air jets 72. It is to be understood that other sources of elevated temperature such as heat lamps may be used in place of or in conjunction with the hot air jets in order to provide sufficient heat to polymerize the coating. Further exposure to elevated temperatures may be accomplished by the conventional festoon dryer system 73. The web with the synthetic plastic film thereon is then wound up on a suitable roll 81.

FIG. 3 shows the flowing of the coating 25 on the web 11 and the formation of a pool of coating in the nip. Although other means may be employed to confine the coating to the surface of the web or prevent its accumulation beyond the web edges, the preferred embodiment employs a pair of pneumatic discharge jets or openings 93 which are adapted to flow a current of air or other gas from a pneumatic pressure supply 91 toward the pool. By positioning these jets as close as possible to the nip and a short distance such as one-half inch in from the web edges, the pool of coating can be kept from flowing beyond the web edges. The air pressure required need only be sufficient to so confine the pool and for this reason pressures only somewhat above atmospheric pressure are necessary.

In conjunction with the air jets and as still another embodiment it has been found desirable to introduce a small amount of water or other aqueous liquid to the nip beyond the edges of the web at the point where the doctor rod contacts the back-up roll directly. The use of the water serves to lubricate the point of contact between the two surfaces and prevent the accumulation of heat caused by friction. In FIG. 3, the water from supply tube 81 is introduced through nozzles 83 just beyond the edges of the web and is directed toward the nip. Any other means may be employed to produce a thin layer of water on the back-up roll.

The coating employed in accordance with this invention comprises a continuous organic liquid phase containing a synthetic polymerizable material; that is, while it is possible to have minor amounts of water and/or solids such as mineral pigments present, they should always exist as a dispersed phase in the organic liquid. This is necessary in order that the flow characteristics of the coating be essentially those of the organic phase. The organic liquid phase may consist almost entirely of polymerizable ingredients, as is preferred, or it may contain minor amounts, up to about 25% by weight, of nonpolymerizable ingredients such as solvents for the polymerizable material. The coatings should be relatively stable for at least short periods of time at the coating temperature while at elevated temperatures they should be readily polymerizable.

The polymerizable materials contained in the coatings in accordance with this invention may be of a wide variety depending upon the physical properties such as heat sealability, moisture proofness, or grease proofness desired in the coated web. In particular, materials which contain ethylenically unsaturated groups or which contain reactive functional groups such as isocyanate or epoxy groups are preferred since these do not yield inert by-products upon polymerization and hence do not introduce problems of their elimination. Particularly suitable coatings are those which yield a cross-linked structure upon polymerization. The polymerizable material may be either monomeric, partially polymerized or a combination of these.

The thickness of the coating will be to a large extent determined by the viscosity of the coating. In order, therefore, to prevent the deposition of unduly low amounts of coating upon the web, it will usually be desired to keep at a minimum the amount of non-polymerizable liquid constituents in the coating. In this way greater amounts of coating can be deposited without the necessity of volatilizing appreciable amounts of inert material during the polymerization and drying step. With more viscous coatings, a further advantage is that less absorption into the web will be encountered.

A particularly suitable coating, since it usually requires no inert solvent, comprises a mixture of (a) a polyester which is the reaction product of a polyhydroxy compound, preferably a polyhydric alcohol, and polycarboxylic acid, at least a portion of the said acid containing ethylenic unsaturation, and (b) an ethylenically unsaturated monomer, with or without (c) a catalyst. Such compositions are well known in the art and are described in numerous publications and patents including U.S. Patents to Ellis, 2,255,313; D'Alelio, 2,288,315; and Gerhart, 2,361,019. The nature of the coating may vary widely depending upon the selection of the ingredients as described in the aforementioned patents. The polyester contains intra-linear ester linkages and is prepared by condensing a polycarboxylic acid or ester forming derivative (such as the anhydride, mono or diester, amide, etc.) with a polyhydroxy compound. At least 25 mol percent of the polycarboxylic acid component should be ethylenically unsaturated, for example maleic acid or anhydride, fumaric acid, citraconic acid, itaconic acid, etc. The remainder of the acid component may contain no ethylenic unsaturation, such as succinic acid, adipic acid, sebacic acid, phtalic acid, terephthalic acid, isophthalic acid, etc. Acids such as citric acid which contain more than three carboxyl groups per molecule may also be employed to give greater rigidity to the coating. The polyhydroxy compounds will contain at least two hydroxyl groups per molecule. Examples of these include ethylene glycol, diethylene glycol, propylene glycol, butylene glycol, glycerine, trimethylol propane, pentaerythritol, the polyethylene ether glycols, etc. The polyester is prepared by heating the polyhydroxy compound and the polycarxylic acid in approximately stoichiometric amounts to cause esterification and facilitate removal of the volatile by-products which are formed. After formation of the polyester an ethylenically unsaturated monomer is combined therewith. The mixture should contain about 5 to 60% by weight of monomer and 40 to 95% by weight of the polyester for economic reasons although even smaller amounts of the monomer will produce an adequate cure. Especially desirable for quick drying coatings of the greatest flexibility is the range of 25 to 50% monomer and 50 to 75% polyester on a weight basis. A stabilizer such as hydroquinone may be added at this stage. Particularly suitable monomers include the hydrocarbons such as styrene, p-methyl styrene, and α-methyl styrene; ethers such as methyl vinyl ether; esters such as vinyl acetate and the alkyl esters of acrylic and methacrylic acid; ketones such as methyl vinyl ketone; and the aldehydes such as acrolein. Monomers containing more than a single unsaturated group such as butadiene, diallyl ether, and diallyl phthalate may also be employed. Preferred are the mono unsaturated monomers which contain terminal ethylenic unsaturation and especially those which are hydrocarbons. In order to facilitate a rapid cure of the polyester-monomer mixture, a catalyst or initiator system is employed, although it is to be understood that a cure can be obtained without a catalyst. Any free radical generating catalyst or initiator such as the peroxides, persulfates, perchlorates, etc., may be used. Particularly preferred are benzoyl peroxide, methyl ethyl ketone peroxide, ditertiary butyl peroxide, dicumyl peroxide and ammonium persulfate. In order to increase the speed of the cure it may be desired to additionally employ in the system an accelerator such as the metal compounds of organic acids. Cobalt and manganese napthenates and octoates are particularly effective accelerators. The addition of amines such as triethylamine or dimethyl aniline even further speeds up the rate of cure.

Another particularly suitable coating comprises a mixture of a polyisocyanate or polyisocyanate engendering compound and a monomer or polymer containing a plurality of hydrogen atoms which are reactive with isocyanate groups. Typical among the polyisocyanates are hexamethylene diisocyanate, meta-toluene diisocyanate and the low molecular weight reaction products of meta-toluene diisocyanate with a triol and a diol such as disclosed in U.S. Patent to Eitel et al. 2,897,166. The active hydrogen containing material should have at least two active hydrogen containing groups per molecule. Reactive groups which are preferred are hydroxyl, primary and secondary amine, and mercapto groups. Examples of suitable materials which can be employed for reaction with the polyisocyanates are glycols such as ethylene glycol and hexamethylene glycol, polyalkyleneether polyols such as the condensation product of ethylene oxide alone or with a polyol such as trimethylol propane, polyamines such as hexamethylene diamine or p-phenylene diamine, alkanolamines such as ethanolamine, the polythiols such as 1,2 ethanedithiol, etc. Especially preferred are the hydroxyl containing polyesters of a polycarboxylic acid with an excess of a polyhydric alcohol, since they can be prepared so as to give a product of the desired viscosity with a requisite number of active hydrogen containing groups. Typical among the polyesters are the commercially available products prepared from adipic or phthalic acid with a diol such as ethylene or butylene glycol with or without a triol such as trimethylol propane or hexanetriol-1,2,6. The polyisocyanate compositions are well known in the art and are exemplified by U.S. Patents to Hill, 2,929,800; Seeger, 2,625,532; Muller et al., 2,729,618.

Still a further type of suitable coating comprises a mixture of a polyepoxide and a curing agent containing active hydrogen. The polyepoxides are generally the condensation product of epicholorohydrin and 2,2-bis-(para-hydroxy-phenyl)propane. The curing agents are exemplified by diethylene triamine, ethylene diamine, phthalic anhydride, polysulfides, boron trifluorideamine complexes, etc. These compositions are described in U.S. Patents to Newey et al., 2,642,412; Castan, 2,324,483; Greenlee, 2,717,885; etc.

Other types of less suitable reaction coatings can also be employed in accordance with this invention.

The amount of coating applied to the web will vary depending upon the viscosity of the coating as well as the speed of the coating operation and to some extent the amount of pressure exerted by the doctor roll against the web and back-up roll. As little as 0.5 lb. of coating per 3,300 square feet of web surface is possible depending upon these factors. In actual practice the choice of the amount to be applied will depend upon the properties desired in the coated web such as heat sealability, moisture proofness, grease proofness, or flexibility. The latter property can also be regulated by the choice of polymerizable material as those which are less crosslinked after polymerization will have greater flexibility.

Generally it is desired that the coating have a viscosity of about 200 to 2,000 centipoises and preferably 400 to 600 centipoises (as measured on a Brookfield Viscometer using a No. 2 spindle at 30 r.p.m.) for ease of application and for smoothness of the coated surface. The viscosity can be regulated to some extent, as previously mentioned, by the use of inert organic solvents.

It will thus be seen from the above that the coating compositions to be employed may or may not contain an inert organic solvent depending upon the viscosity of the synthetic polymerizable material. In either case various additives can be included to modify the properties of the coating. Thus mineral pigments such as clay, calcium carbonate or titanium dioxide may be added to the coating composition provided they are of sufficiently fine praticle size so as to pass readily under the doctor rod. When such a pigment does not blend well in the coating, it may be first slurried in a small amount of water and the mixture emulsified in the organic liquid. Excessive amounts of water may cause precipitation of the polymerizable material or impede drying. Dyes, plasticizers, stabilizers, etc., may also be incorporated in the coatings.

The extremely smooth coatings in which the method of this invention results indicates more than a mere coating of the surface of the web. The effect is nearly that of first forming a smooth layer of coating and then depositing it upon the web.

The exact temperatures employed for heating the coated web will depend primarily upon the type of coating employed. With most reaction coatings, temperatures of at least 125° F. and often as high as 250° F. or more may be necessary.

The amount of coating composition deposited on the cellulosic web may vary widely. With most of the synthetic resins as little as 1 pound per ream dry (500 sheets, 25 x 38 inches) or about 0.06 mil will produce a satisfactory barrier against grease and moisture. For most purposes there is no need to apply more than 10 pounds per ream.

The speed of the coating operation will largely be determined by the time required for the coating to fully polymerize at the heating temperatures. Depending upon the type of coating and the temperature, the coater can be operated at speeds of up to 500 lineal feet per minute or more.

The webs to be coated in accordance with this invention are flexible and can be fibrous or non-fibrous as desired. Particularly suitable are cellulosic webs such as paper. The cellulosic webs may be either bleached or unbleached stocks of paper and paperboard. In addition, they may be preliminarily coated, semi-coated or sized in order to decrease the absorption of the polymerizable mixture into the web. Normally papers with basis weights between 13 and 120 pounds per ream (500 sheets, 25 x 38 inches) are suitable. Glassine has been found to produce a particularly high quality coated sheet by the method of this invention.

The following examples are given as being illustrative of the invention. Parts are by weight unless otherwise stated.

*Example I*

A propylene glycol maleate-isophthalate polyester was prepared by heating a mixture in the ratio of 0.5 mole of isophthalic acid, 0.5 mole of maleic anhydride, and 1.05 moles of propylene glycol to remove water of esterification until the acid number was reduced to 19. To 55 parts of the cooled polyester were added 0.015 part hydroquinone, based on the complete resin solution and 45 grams of styrene with stirring to produce a viscous mixture. This mixture was combined with 1 part of a solution of 6% by weight cobalt naphthenate in mineral spirits. The polyesters or solids content is approximately 55% by weight.

This resin composition, as one component of the coating, is introduced into one of the inlets of the mixing device, mounted in the apparatus as shown in FIG. 1. Simultaneously, a solution of 60% methyl ethyl ketone peroxide initiator in dimethyl phthalate is introduced into the other inlet in the proportion of 1 part initiator to 50 parts of resin composition. The mixer contains a motor driven agitating device to thoroughly blend the mixture. As the components are continuously supplied to the mixer, they are blended and discharged onto the surface of a moving web. The coating apparatus is that described in the figures of the drawings. The doctor rod is ⅜ inch in diameter. The web is uncoated paper of about 52 inches in width and 60 lbs. per ream (500 sheets, 25 x 38 inches) which had been preliminarily calendered. The back-up roll is 10½ inches in diameter and has a rubber cover of a P. and J. hardness of about 85.

The speed of the web and the surface speed of the back-up roll is about 200 feet per minute. The doctor rod is motor driven in an angular direction which is opposite to the movement of the web and at an angular speed of about 20 revolutions per minute. The pressure of the flexibly mounted doctor rod against the web and consequently against the rubber covered back-up roll is about 5 pounds per linear inch across the length of the doctor rod. The web is led from the nip between the back-up roll and the doctor rod tangentially to the doctor rod only. Thus after leaving the nip the coated web wraps the circumference of the doctor rod for about 10° of arc.

The supply of resin and initiator components to the mixer is so regulated to form a pool of coating on the moving web adjacent to the doctor rod of about 1 inch in height. This is adequate to cover the working edge of the doctor rod throughout its entire working length. At each of the edges of the moving web in the nip, a jet of air as shown in FIG. 3 is directed toward the nip to prevent coating from flownig beyond the web edges.

The web is narrower in width than the doctor rod and back-up roll. For this reason, as shown in FIG. 3, beyond the edges of the web where the doctor rod contacts the back-up roll directly, a small amount of water is flowed onto the back-up roll to prevent heat caused by friction of the oppositely moving surfaces.

As the coated web emerges from the coater it passes over a guide roll and thence through a hot air line. The hot air, having a temperature of about 200° F., is directed toward the uncoated side to polymerize the coating and keep the web suspended until dry and substantially tack free. After hanging for a brief period on the festoons the web is wound up into a roll.

The coated web has a deposit of about 1.5 lbs., of coating per ream (500 sheets, 25 x 38 inches) dry. Because of a small difference in the amount of coating used and that deposited on the web, it appears that some of the coating, probably styrene monomer, had been volatilized.

The coated web is highly flexible and extremely smooth and glossy. The gloss, as determined on a General Electric Glossmeter, is in excess of 100. Since the coated web is opaque and has a nearly pure white appearance, it is eminently suitable as a decorative wrapping material. Moreover, the coated web is extremely impervious to grease, water and water vapor and hence is highly useful as a wrapping material where these properties are desired.

*Example II*

Example I is repeated using the same coating therein except that the resin component supplied to the mixer is a dispersion containing 9 parts of water emulsified by vigorous agitation into a mixture of 65 parts of the polyester, 0.015 part hydroquinone, 26 parts styrene, and 2 parts cobalt naphthenate solution. The polyester or solids content of this component is approximately 65% by weight.

The coating and drying operation is the same as in Example I except that a ¼ inch diameter doctor rod is employed. The web has a smooth uniform deposit of between 4 and 5 lbs. of coating per ream (500 sheets, 25 x 38 inches) with an exceptionally high gloss. The presence of the small amount of water does not affect the coating operation.

*Example III*

A polyester is prepared by condensing a mixture in the ratio of 0.4 mole of isophthalic acid, 0.6 mole of maleic anhydride and 1.05 moles of diethylene glycol until the acid number is less than about 19. To 62 parts of the polyester is added 38 parts of styrene and 1 part of a 6% by weight solution of cobalt naphthenate in mineral spirits to form a resin component. A second component is prepared containing 60% by weight of methyl ethyl ketone peroxide dissolved in dimethyl phthalate. These components are separately supplied to the mixer in the ratio of 50 parts of resin mixture to 1 part of the initiator solution.

The coater apparatus and procedure is the same as described in Example II. The web is paper which contains a preliminary coating containing calcium carbonate pigment and casein adhesive.

Again a high gloss coated web is produced. The coating has a smoother appearance than that produced in Example I or II.

*Example IV*

The coating procedure of Example I is repeated to produce a polyurethane coated web. The apparatus is the same except that the doctor rod is ¼ inch in diameter.

The components of the coating, a polyester and a polyisocyanate, are separately introduced to the mixer. The polyisocyanate is an ethyl acetate solution containing about 75% by weight of the reaction product of an isomeric mixture of 2,4 and 2,6 tolylene diisocyanate with trimethylol propane in a mole ratio of about 3:1. The polyester is a viscous liquid having a hydroxyl number of about 270, an acid number of about 4 and is the condensation product of a mixture containing adipic acid and hexantriol-1,2,6. The components of the coating were supplied to the mixer in the ratio of 2 parts of the polyisocyanate to 1 part of the polyester.

The web contained about 10 pounds per ream dry (500 sheets, 25 x 38 inches) of the coating. The finish was extremely smooth and glossy and virtually free of surface defects.

Having thus disclosed the invention it will be apparent that the various modifications thereof may be made which appear within the spirit of the invention and the scope of the claims.

We claim:

1. Apparatus for the continuous coating of moving webs comprising: mixing means for rapidly blending and supplying a coating to the surface of the web, fixedly mounted doctoring means substantially uniform throughout its length acting to continuously smooth a small portion of the coating on the moving web while confining a major portion of the coating as a pool on the surface of the web, a back up roll adjacent the doctoring means in a position to support the web against pressure which is exerted thereon by the doctoring means, said doctoring means and adjacently mounted roll being wider than the width of the web to be coated, and means for lubricating with an aqueous liquid the line of direct contact between the doctoring means and the roll beyond the edges of said web.

2. Apparatus as defined in claim 1 wherein the doctoring means and adjacently mounted roll are so disposed that the coated web wraps about the former for at least about 5° of arc after passing out of contact with the latter.

3. An apparatus for coating a web substrate as defined in claim 1 wherein said doctoring means comprises a rod of a diameter substantially less than the diameter of the back-up roll and further including means for regulating the wrap of the coated surface of said web about the surface of said doctor rod.

References Cited by the Examiner

UNITED STATES PATENTS

| | | |
|---|---|---|
| 2,155,083 | 4/1939 | Drewsen. |
| 2,322,533 | 6/1943 | Mayer _____ 118—63 |
| 2,423,555 | 7/1947 | Ender _____ 117—111 |
| 2,457,657 | 12/1948 | Glick. |
| 2,631,960 | 3/1953 | Dafter. |
| 2,632,422 | 3/1953 | Elkins _____ 118—415 |
| 2,759,847 | 8/1956 | Frost et al. _____ 117—64 |
| 2,794,754 | 6/1957 | Schroeder _____ 117—161 |
| 2,847,196 | 8/1958 | Franklin et al. _____ 117—104 X |
| 2,921,867 | 1/1960 | Shaw _____ 117—155 |
| 2,946,307 | 7/1960 | Warner _____ 118—414 X |

WILLIAM D. MARTIN, *Primary Examiner.*

RICHARD D. NEVIUS, JOSEPH REBOLD, R. E. ZIMMERMAN, S. W. ROTHSTEIN, *Assistant Examiners.*